United States Patent [19]
Bates

[11] 3,874,618

[45] Apr. 1, 1975

[54] COMBINATION OF A ROTARY PRIME MOVER-COMPRESSOR WITH A VEHICLE, SUCH AS AN AIRCRAFT

[76] Inventor: Kenneth Clayton Bates, 28 Scenic Dr., Poughkeepsie, N.Y. 12603

[22] Filed: Apr. 24, 1972

[21] Appl. No.: 246,876

Related U.S. Application Data

[60] Division of Ser. Nos. 40,720, May 26, 1970, abandoned, and Ser. No. 65,233, Aug. 19, 1970, Pat. No. 3,781,146, said Ser. No. 40,720, Continuation of Ser. No. 658,175, said Ser. No. 65,233, Continuation-in-part of Ser. No. 40,720.

[52] U.S. Cl. ................................. 244/50, 180/66 F
[51] Int. Cl. ............................................. B64c 25/50
[58] Field of Search ...... 244/50, 103 S, 103 R, 100; 180/66 F, 66 R, 14, 55; 418/6, 165, 191, 196, 225, 227, 248; 105/96.2, 53

[56] References Cited
UNITED STATES PATENTS

| | | | |
|---|---|---|---|
| 723,436 | 3/1903 | Bayley | 418/196 X |
| 1,287,642 | 12/1918 | Conklin | 418/6 |
| 2,353,730 | 7/1944 | Joy | 180/66 F |
| 2,362,705 | 11/1944 | Macartney et al. | 418/191 X |
| 3,034,748 | 5/1962 | Koup | 244/50 |
| 3,090,361 | 5/1963 | Orshansky, Jr. | 180/66 F |

FOREIGN PATENTS OR APPLICATIONS

| | | | |
|---|---|---|---|
| 1,134,870 | 4/1957 | France | 180/66 F |

*Primary Examiner*—Trygve M. Blix
*Assistant Examiner*—Paul E. Sauberer
*Attorney, Agent, or Firm*—Dale A. Bauer

[57] ABSTRACT

A readily reversible rotary apparatus combinable with an aircraft landing gear and other vehicles comprising a first mechanism selectively operable either as a compressor or as a prime mover selectively powered either by fluid pressure or by combustion of a confined fuel-air mixture under pressure and further comprising a second mechanism driven by the first for compressing air or a combustible mixture for controlled introduction into the expansion or combustion chambers of the first mechanism, said second mechanism being adapted for use also as a prime mover powered by fluid pressure. The flow of compressed and expanding gases in said apparatus is controlled primarily by rotatable elements.

19 Claims, 16 Drawing Figures

COMBINATION OF A ROTARY PRIME MOVER-COMPRESSOR WITH A VEHICLE, SUCH AS AN AIRCRAFT

This application is a division of my copending applications Ser. No. 40,720, filed May 26, 1970 (abandoned Oct. 29, 1972) and Ser. No. 65,233, filed Aug. 19, 1970, (now U.S. Pat. No. 3,781,146), said application Ser. No. 40,720 being a continuation of my application Ser. No. 658,175, filed Aug. 3, 1967 (abandoned May 26, 1970), and said application Ser. No. 65,233 being a continuation-in-part of said application No. 40,720.

This invention relates to apparatus adapted for use as a combined engine and compressor or alternatively as either a prime mover or a compressor and to the method of operation thereof as an internal combustion engine.

A primary object of the present invention is to provide a near-stoichiometric engine wherein a mixture of fuel and air are burned in exact amounts required for substantially complete chemical reaction and which therefore functions so that the emission therefrom will not appreciably pollute the surrounding atmosphere.

One other object of the invention is the provision of novel apparatus for converting energy from one form to another with a very high level of efficiency.

Another object is to provide a novelly constructed direct acting rotary engine wherein the power rotor which forms a surface of the expansible reaction or combustion volumes or chambers is integral with or is in effect the output shaft, and said chambers are so formed that the entire energy of the reacting or expanding gases therein is exerted with maximum efficiency directly on such rotor and hence on the output shaft to impart rotary motion thereto without the interposition of mechanical linkages, eccentrics, cranks or the like relied upon in prior known apparatuses.

Another object of the invention is to provide a novel prime mover wherein gaseous pressures may be converted to mechanical torque and vice versa with maximum or optimum mechanical advantage in excess of that obtained with known apparatus adapted for comparable uses.

Still another object is to provide a novelly constructed rotary engine powered by expansible gases and alternatively adapted to be mechanically driven for use as a gaseous compressor wherein gaseous pressures acting radially toward the rotor axis on diametrically opposed sides of the power rotor are in substantial balance at all times, thereby effectively floating the rotor to substantially eliminate rotor bearing load and to minimize any frictional load between the peripheral surfaces of the rotor and its surrounding housing.

A further object is to provide a novel rotary type engine wherein the engery of expanding gases in the expansion or combustion chambers thereof is utilized with maximum efficiency in producing rotor rotation.

Another object is to provide novel energy converting apparatus wherein friction and other causes of energy and power losses are reduced to a minimum by maximum utilization of pressure balanced parts and synchronously driven rotary means for controlling the flow of gases or other fluids.

A still further object is to provide apparatus of the above character including an internal combustion engine in novel combination with means driven thereby for compressing and storing a gaseous medium or combustible fuel-air mixture prior to introducing the same into the combustion chambers of the engine.

Still another object is to provide a novel method of operating an internal combustion engine which includes the step of compressing a gaseous medium or combustible gaseous mixture to an optimum pressure prior to introduction thereof into an expansible reaction or combustion chamber for expansion or ignition therein to effect continued expansion of the chamber.

It is also an object of the invention to provide a rotary engine of novel construction wherein each piston or raised reaction surface of the rotor may be power pulsed a multiplicity of times during each revolution of the rotor and integral output shaft as compared to one pulse per piston for each two revolutions of the corresponding output shaft in an Otto or 4-stroke cycle reciprocating piston engine.

Another object is to provide a novel internal combustion engine of the rotary type wherein all of the spent or burned gases are expelled from each combustion chamber before the introduction therein of a fresh combustible charge so that the chamber is filled each cycle with a fresh, uncontaminated combustible mixture having an optimum fuel-air ratio which burns efficiently and completely, thereby greatly reducing the air pollution effect of the exhaust or emission gases.

A further object is to provide a rotary internal combustion engine which may be designed without compromise with other advantageous features to allow adequate time between ignition in and exhaust from each combustion chamber to insure complete burning of the combustible mixture over a wide range of speeds.

A further object is to provide a novel combination of a rotary type combined prime mover and compressor with a heavier-than-air aircraft, whereby the take-off roll for any given aircraft at a given take-off speed may be appreciably shortened while at the same time enhancing the safety of the craft, its passengers and cargo, and whereby redundant braking power is advantageously made available on landing to assist the normal braking facilities and thereby extend the operating life and improve the safety thereof.

A still further object is to provide a rotary type engine, compressor or combination thereof which is of simple, low-cost construction and consumes less space, particularly in an axial direction than known engines of comparable power output and versatility and known compressors of comparable capability.

Another object is to provide novel apparatus of the above character which is capable of producing high output torque at all speeds and capable of high speed operation under a wide range of loading and operation in a variety of operating modes without appreciable vibration.

Another object is to provide a novel, readily reversible rotary type engine which may be effectively and efficiently operated with steam or pressurized gases or liquids as a source of energy or as an internal combustion engine wherein the combustible is supplied in the form of either a fuel-air or other combustible mixture or in the form of so-called solid fuel, such as liquid fuel, and which may be readily and quickly converted from one such mode of operation to another.

Still another object is to provide apparatus novelly and economically combined with an aircraft for driving or spinning-up the wheels of the landing gear assembly while the craft is airborne to a speed consistent with the landing speed of the craft.

The invention also contemplates the provision of apparatus in novel combination with the landing gear of an airplane whereby a driving torque may be selectively applied to the wheels for taxiing, docking, take-off acceleration and pre-landing spin-up, a braking force may be applied to the wheels for overcoming the momentum of the craft on the ground as when landing, and the kinetic energy of the landing craft may be converted to gaseous pressure and stored for subsequent use, such as for the application of driving torque to the wheels, thereby reducing the required take-off distance, greatly enhancing the operational safety, reducing the noise level and increasing the life of the landing gear parts, particularly the tires and brakes.

It is a further object of the invention to provide novel and practical means for conserving and utilizing the tremendous kinetic energy of a moving vehicle, such as a landing aircraft, by successively converting said energy to gaseous pressure and mechanical torque.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, which are to a large extent diagrammatic, and wherein like reference characters refer to like parts throughout the several views.

The single embodiment of the invention illustrated in the drawing by way of example is in the form of a multi-cylinder rotary engine in novel combination with means for compressing, storing and utilizing gases and gaseous combustible mixtures for use in driving the engine power rotor. In general the illustrated apparatus comprises as major elements a main power and compressor rotor R including an integrally connected output shaft, here shown as a hollow tube 10; an annular housing H which includes a central member or section 11 and annular end plates or covers 12, 13 to form a channel that closely embraces at least an outer peripheral portion of said rotor; an annular rotor R' rotatable in an annular channel of rectangular cross section at the outer peripheral portion of housing H and drivably connected to rotor R; one or more generally cylindrical members 14 rotatably mounted and fluid pressure balanced in recesses 15 in the inner periphery of annular housing member 11 to perform the dual functions of flow control valves and dividers of the annular space 16 between housing member 11 and rotor R; and similar cylindrical members 17 also rotatably mounted in recesses 18 in the outer periphery of housing member 11 to function as fluid pressure balanced dividers of the annular space 19 between said housing member and rotor R'.

To facilitate selective conversion of the apparatus from one to another of the several different possible modes of operation, a disc-like valve member 41 is mounted for limited angular adjustment on end plate 12 which is ported and, in a manner fully described below, cooperates with disc 41 and conduits carried thereby to direct the flow of gases to and from the various segregated compression, storage, expansion, exhaust and combustion spaces or chambers within the apparatus. In addition to the annular spaces 16 and 19 which are divided into reaction and exhaust volumes by rotors R and R', respectively, housing H is further compartmented between said spaces to form a ring of gas tight storage spaces 42 and 43 for storage of gases and combustible gaseous mixtures compressed by rotors R and R', respectively, or from other suitable external sources.

Figure 1:
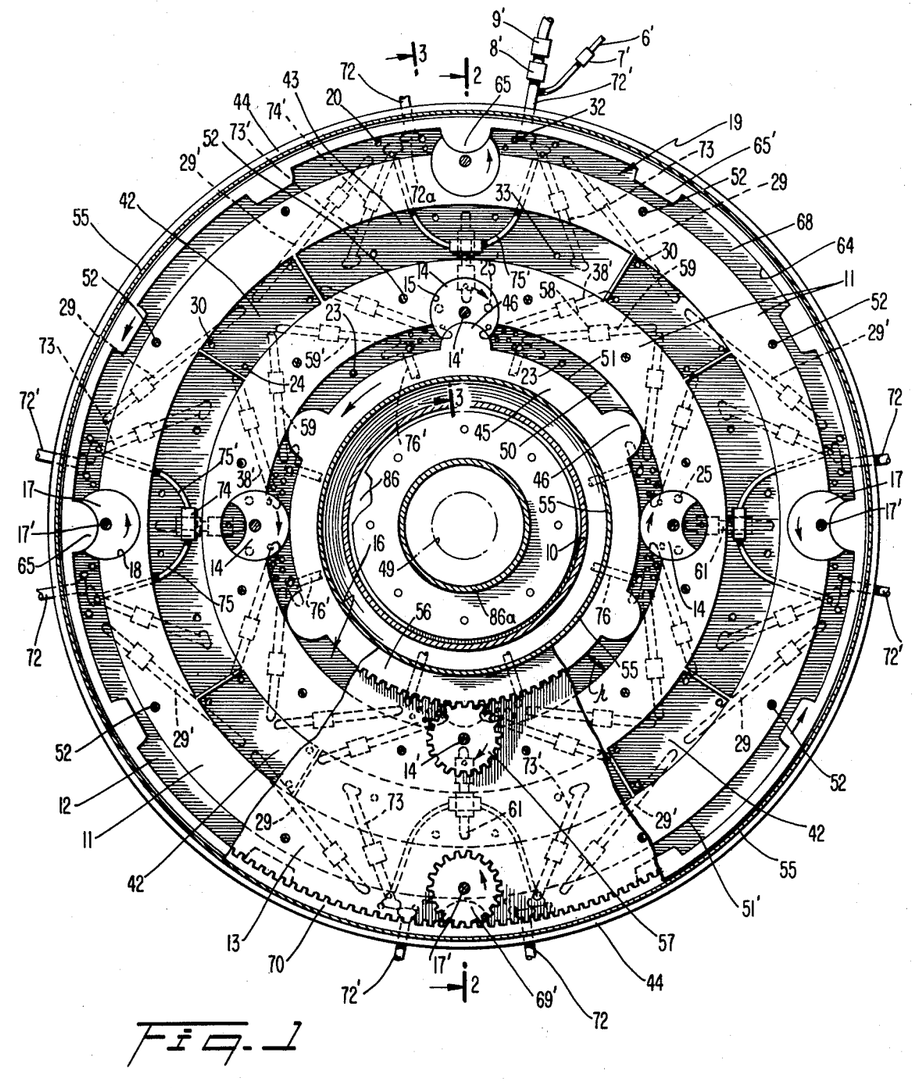
FIG. 1 is a transverse sectional view taken primarily on line 1—1 of FIG. 2 and illustrating one form of apparatus embodying the invention.
Figure 2:
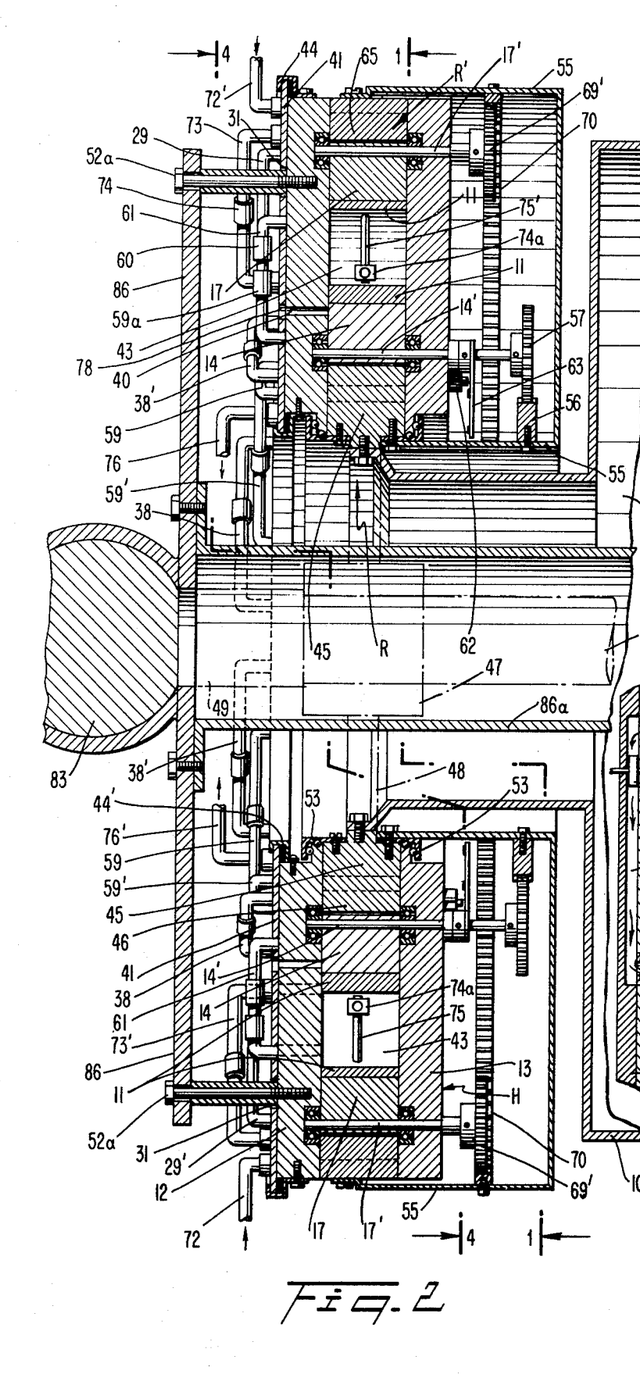
FIG. 2 is an axial section of the apparatus of FIG. 1, the section being taken on line 2—2 of FIG. 1.
Figures 5, 6, 7:
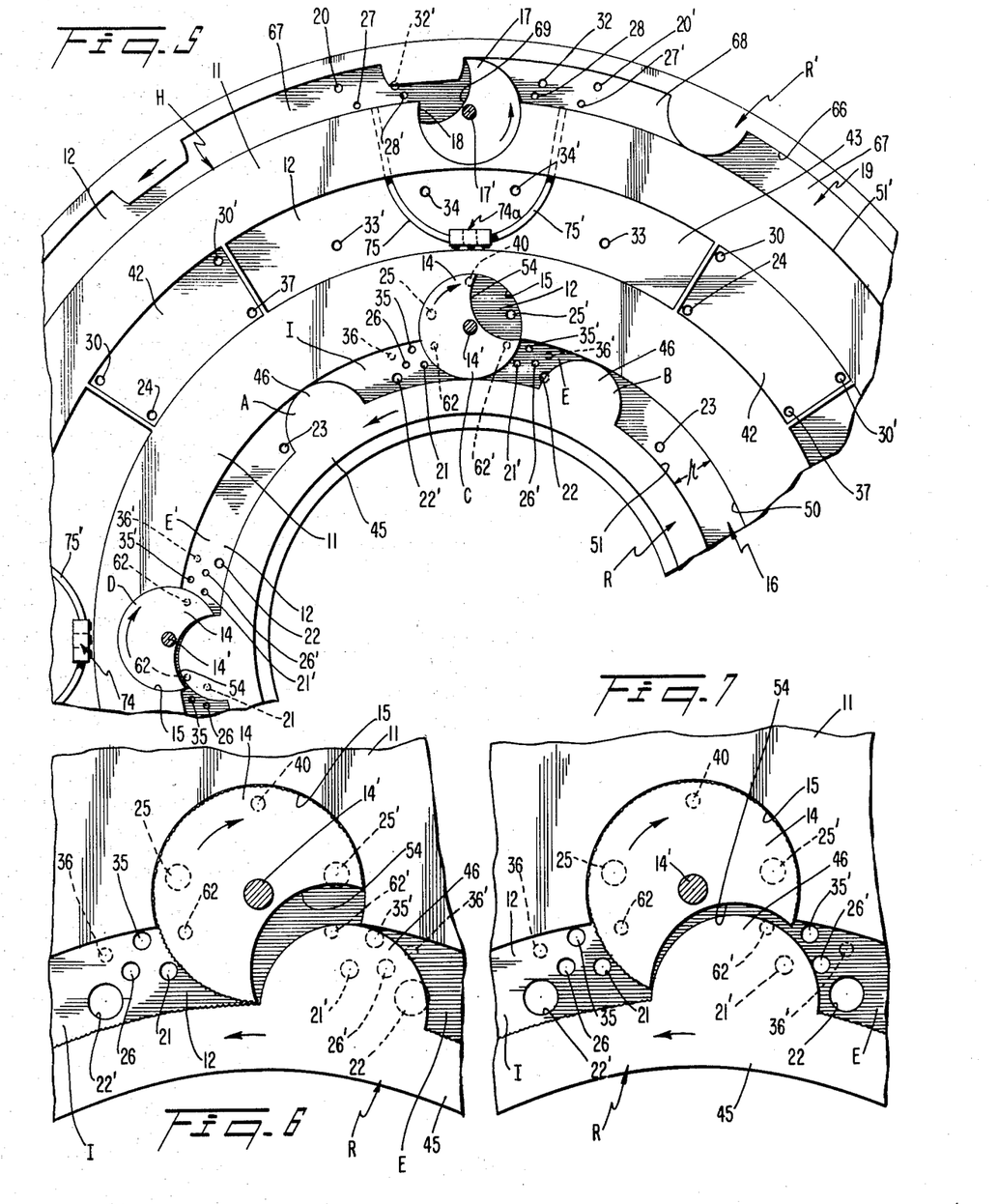
FIG. 5 is a detail diagrammatic view, taken in the plane of line 1—1 in the upper half of FIG. 2, showing the general locations of the fluid ports in the housing.
FIGS. 6 and 7 are enlarged scale, detail views of a part of the power rotor and a rotary divider illustrating successive operative positions thereof following the position of FIG. 5 during counter-clockwise rotor rotation, the view being taken in the same plane as FIG. 5.

The porting in end plate 12 as viewed from within or through annular spaces 16 and 19 and compartments 42 and 43, and hence from the right in FIG. 2, is diagrammatically illustrated in FIG. 5. It will be understood that as shown in FIG. 1, such porting and connecting conduits therefor are duplicated in end plate 12 and on valve disc 41 in the vicinity of each of the rotary dividers 14 and 17. For the most part, for each port in plate 12 and each connecting conduit on valve disc 41 which functions during the counter-clockwise rotor rotation (FIGS. 5 to 12), there is a complementary port or conduit disposed at the opposite side of a respective divider 14 or 17 which functions for the same purpose during clockwise rotor rotation. Such complementary ports and conduits are identified herein by the same numerals, but those which are operative for clockwise rotor rotation have an added "prime" ('). For example, the inlet port 20 is for fuel-air mixture during counter-clockwise rotation (FIG. 5), while the complementary port 20' is for fuel-air mixture during clockwise rotation.

Annular valve disc 41 is supported on end plate 12 by means of channel rings 44 and 44' and is free for limited angular adjustment to selectively open and close the ports in said plate and to operatively connect selected ports in the plate to each other through conduits in or on said disc. As illustrated, valve disc 41 is angularly adjustable in either direction relative to plate 12 from a central or neutral stop position 0 to a choice of three different operating positions to effect operation by pressurized gas, steam, or liquid (position I), by internal combustion (position II), and as a compressor (position III). For clockwise and counter-clockwise rotation of the rotors R and R', the valve disc is adjusted counter-clockwise and clockwise, respectively, from its central position 0, as viewed in FIG. 8, or from the right in FIG. 2. The various connections for fluid flow effected by valve 41 in its different positions will more fully appear hereinafter.

In the form shown, a novel basic engine portion of the complete apparatus as contemplated by the invention, which portion may be alternatively operated as a compressor, comprises only a relatively small number of parts of simple construction that may be manufactured and assembled with facility at relatively low cost and utilized separately from the rest of the illustrated mechanism. Such engine comprises the rotor R which may consist of a cylindrical ring or main body portion 45 having on the periphery thereof a plurality (four shown) of equally spaced, radially protruding portions 46, herein called pistons. Said rotor body may be directly connected to a load or a source of power by any suitable known means, such as a hub and spokes or the equivalent and a shaft keyed or otherwise drivably connected to said hub. Alternatively, the rotor may be directly connected to a hollow shaft 10.

Rotor portions 45, 46 have a close gas-tight but free running fit in the annular central section 11 of housing H and between the inner peripheral portions of cover plates 12, 13, said central section and plates being secured together by bolts 52 or other suitable means. For purposes to more fully appear hereinafter, said central section 11 of the housing is honeycombed or cellular with axially extending passages therethrough from end to end and closed at the ends by end plates 12 and 13 to form the arcuate storage compartments or chambers 42 and 43. Said end plates extend inwardly beyond the inner periphery 50 of the central section 11 to form the annular channel-shaped recess 16 for receiving the peripheral portion 45, 46 of rotor R, whereby to form enclosed arcuate spaces or chambers between successive rotor ribs or pistons 46 and rotary dividers 14. If desired, sealing rings or strips of any suitable type known to the art may be interposed between the annular end surfaces of rotor ring 45 and the adjacent surfaces of end plates 12 and 13. Similarly, transverse and radial sealing strips may be provided in a known manner across the peripheral and end surfaces of pistons 46 to minimize leakage from the arcuate chambers formed between the rotor R and the housing H.

Although pistons 46 may be given many different shapes, the same are preferably of circular arc contour in transverse section as viewed in FIG. 1 with a radius equal or nearly equal to the radial distance $r$ between the circular arc peripheral surface 51 of rotor ring 45 and the inner peripheral surface 50 of housing member 11, whereby the surface of pistons 46 are substantially tangent to surface 50. To further insure a sealing relation between the ends of rotor ring 45 and end plates 12, 13, flanged rings 53 (FIG. 2) may be secured to the rotor R with the external flanges thereof embracing said plates, preferably through the medium of ball bearings to resist axial separation of the plates. It will thus be seen that the axial dimension of an engine according to the invention may be kept relatively small, thereby adapting it for use in novel combination with vehicles, including heavier-than aircraft, in a manner hereinafter described.

Novel means are provided in the form of rotary, fluids pressure balanced space or volume dividers 14 which may also function at the same time as valve members mounted in housing H for cooperation therewith and with rotor 45, 46 to divide the annular space 16 between rotor R and the housing intake or reaction volumes I and exhaust volumes E (FIG. 5) and to some extent to control the flow of gases to and from said volumes. In the specific form shown, four such dual function members 14 of generally cylindrical shape, but recessed to accurately receive pistons 46, are mounted in equally spaced circular arc cells or cavities 15 in central housing section 11, each of which cavities is spanned at its ends by end plates 12, 13 and intersects the inner periphery 50 of said housing section to provide an opening for communication between the cavity and volumes I and E and to permit cooperation of said members 14 with rotor 45, 46. The rotary members 14 have a close running fit with the arcuate walls of cavities 15 and with the inner faces of end plates 12, 13. Each of the spacers or dividers 14 is supported on an axle 14' journalled by roller or sleeve bearings or other suitable means in plates 12, 13 (FIG. 2) and is preferably driven synchronously with rotor R in a manner described below.

Preferably, the peripheral contour of each member 14 is such and the axis 14' thereof is so positioned that the peripheral surface thereof will make rolling contact and hence sealing engagement with the circular arc peripheral surfaces 51 of rotor ring 45 and sealingly interfit with pistons 46. To this end, each valve member or space divider 14 has an axially extending slot or recess 54 preferably shaped to quite accurately receive the rotor pistons 46 and permit the same to pass as the rotor and divider rotate, the surface speeds thereof being equal. The outer portion of a piston is thus accurately received in a divider recess 54 in such manner as to maintain a sealing relation between divider 14 and rotor R as the piston moves past the divider. The relative contours, sizes, spacing, and angular speeds of rotor R and dividers 14 are so chosen that the surface recess 54 of each divider will accurately mesh with each rotor piston 46. It will thus be apparent that there will never by any appreciable fluid leakage from one side to the other of a divider in annular space 16. It will be further apparent that when any given piston 46 has passed a valve member or divider 14, the latter will sealingly divide the space between said piston and the adjacent following piston into separate volumes I and E (FIG. 5). The leading or increasing volume I, as determined by the direction of rotor rotation, may be regarded as a reaction, expansion or combustion chamber and the trailing volumes E may be regarded as an exhaust or compression chamber.

As shown, the rotary members 14 are rotatably driven by rotor R to insure synchronism and accurate meshing of pistons 46 with recesses 54. The drive train between rotor R and elements 14 consists of a drum 55 or its equivalent suitably secured to the inner periphery of rotor ring 45 and an annular gear 56 on the drum which is in constant mesh with a pinion 57 on an extension of the shaft of axle 14' of each valve or divider element 14. The size relationship of annular gear 56 and pinions 57 is preferably such that the peripheral surface speed of each element 14 is equal to the speed of rotor surface 51, thus providing rolling and hence substantially frictionless sealing contact between the adjacent surfaces of the rotor and said divider elements. Said surfaces may have fine meshing ribs, knurling or the like thereon as shown in FIG. 6 to improve sealing at the engaging regions and further insure against leakage between the rotor R and dividers 14.

To provide overlapping power pulses for driving rotor 45, the number of equally spaced pistons 46 on the rotor exceeds the number of the dividers 14. Preferably, the number of each is even, and the same are angularly distributed to permit simultaneous balancing power pulses on diametrically disposed sides of the rotor R to substantially eliminate the imposition of rotor bearing load by said pulses. Although the ratio of dividers to pistons may be practically varied over a relatively wide range, the ratio in the example shown is conveniently four dividers 14 to six rotor pistons 46. Accordingly, each divider or valve member 14 makes six revolutions on its own axis 14' for each revolution of the power rotor R on its axis and, as will be more particularly pointed out below, 24 power pulses will occur during each rotor revolution, said pulses occurring as twelve pairs. The pulses of each pair occur simultaneously at diametrically opposite sides of the rotor, thereby balancing the radial thrust thereof on the rotor and shafts 10 and 55 to thus float the rotor in the housing and minimize the resistance to rotation of the rotor. As exemplary alternatives, each valve or divider member 14 may be provided with two diametrically disposed grooves or recesses 54, in which case the circumference thereof and of pinions 57 can be doubled for cooperation with the rotors as illustrated, or the number of pistons 46 on the rotor could then be also doubled to provide 48 power pulses, i.e., 24 pairs of simultaneous pulses, during each power rotor revolution.

The novel engine-compressor structure R, H thus far described in detail may be effectively and efficiently operated in either direction of rotor rotation as a compressor or as an engine operable in accordance with any of several modes of operation, such as by high pressure steam, a compressed gaseous medium, a liquid under pressure, a compressed carburated fuel-air mixture, or compressed air with injected solid fuel. In the following description relative to modes of operation, reference will be made to any two adjacent rotor pistons 46 as pistons A and B and to any two adjacent rotary dividers 14 as dividers C and D, since each pair of adjacent pistons cooperates successively with each pair of adjacent dividers in the same manner during each revolution of the power rotor. In the illustrated embodiment, the energy providing steam or expanding gases for driving rotor 45, 46 in a prime mover or engine mode of operation are introduced into and spent gases are exhausted from chambers I and E, respectively, through ports in end plate 12 under control of dividers 14 functioning as valves and of other suitable valve means, examples of which will be hereinafter described.

Figure 11:
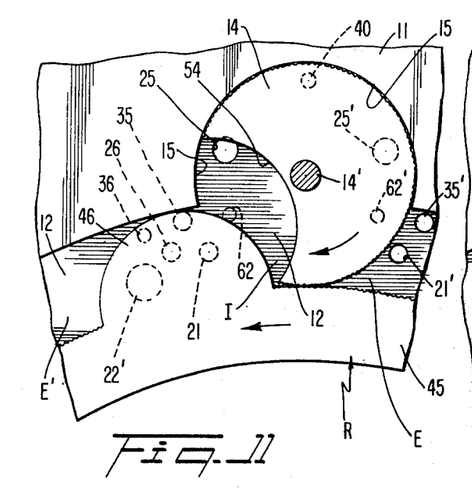
FIGS. 11 and 12 are views similar to FIG. 6 showing successive positions of the rotor and divider following the successive positions illustrated in FIGS. 7, 8 and 9.
Figure 12:
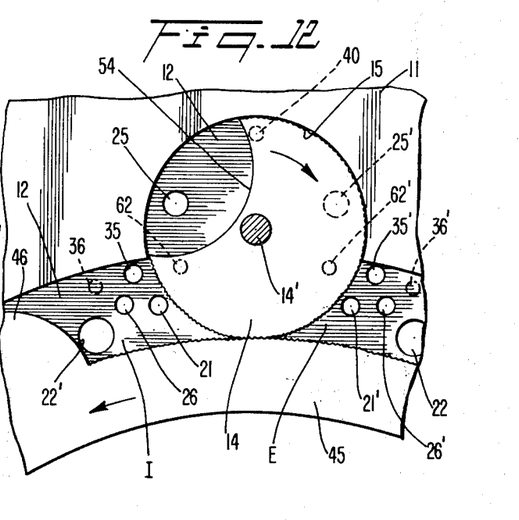

The engine may be started and, if desired, operated as a prime mover with the rotor turning counter-clockwise (FIGS. 5 and 12) by admitting high pressure fluid, such as compressed air, to reaction chamber I from a suitable source through an inlet port 21 in end plate 12. The expansible fluid thus admitted to the arcuate reaction chamber I between rotor piston A and rotary divider C acts against the surface of piston A to impart rotation to rotor R, drum 55 and, hence, divider C until the succeeding or trailing piston B meshes with (FIG. 8) and passes divider C and covers the inlet port 21 (FIG. 11). This conversion of fluid pressure energy to high mechanical torque applied to the rotor is accomplished with maximum efficiency, since the entire resultant applied force vector acts normal to a radial plane containing the rotor axis and is expended solely in imparting motion to the rotor. At the same time gases in the volume E (FIG. 5) between piston B and divider C are driven out through an exhaust port 22 in end plate 12. The fulid pressures acting on the divider C are balanced and hence, do not tend to rotate it.

When piston B, moving counter-clockwise, has passed divider C and inlet port 21 the incoming pressurized gases will similarly react against piston B in the reaction space I between it and divider C. Shortly thereafter, piston A will mesh with and pass divider D, thereby forming an arcuate exhaust volume between piston B and divider D, such as the volume E' in FIG. 5. Thus, as piston B is moved through the piston A and closer to divider D, reducing said exhaust volume E', the spent gases therein are driven out through an exahust port 22 and preferably through a one-way check valve (not shown) or the like to atmosphere or through port 21', a one-way check valve 58 in conduit 59 and port 24 into a suitable storage space, such as chamber 42, which may be vented to atmosphere by a suitable safety valve. Accordingly, after each of the six pistons 46 passes each of the four dividers 14 in either direction during a single revolution of rotor R, a power pulse is applied to the piston. Each such pulse is initiated before the preceding pulse is completed to insure smooth operation of the rotor. Suitable valve means, such as disc 41, are provided for selectively closing any of said ports in plate 12 when the same are not in use. As pointed out above, it will be understood that when pressurized gas is admitted into one chamber I, it is preferably simultaneously admitted to a like, diametrically disposed chamber so that the radial forces of the two charges on the rotor R are balanced.

Figure 4:
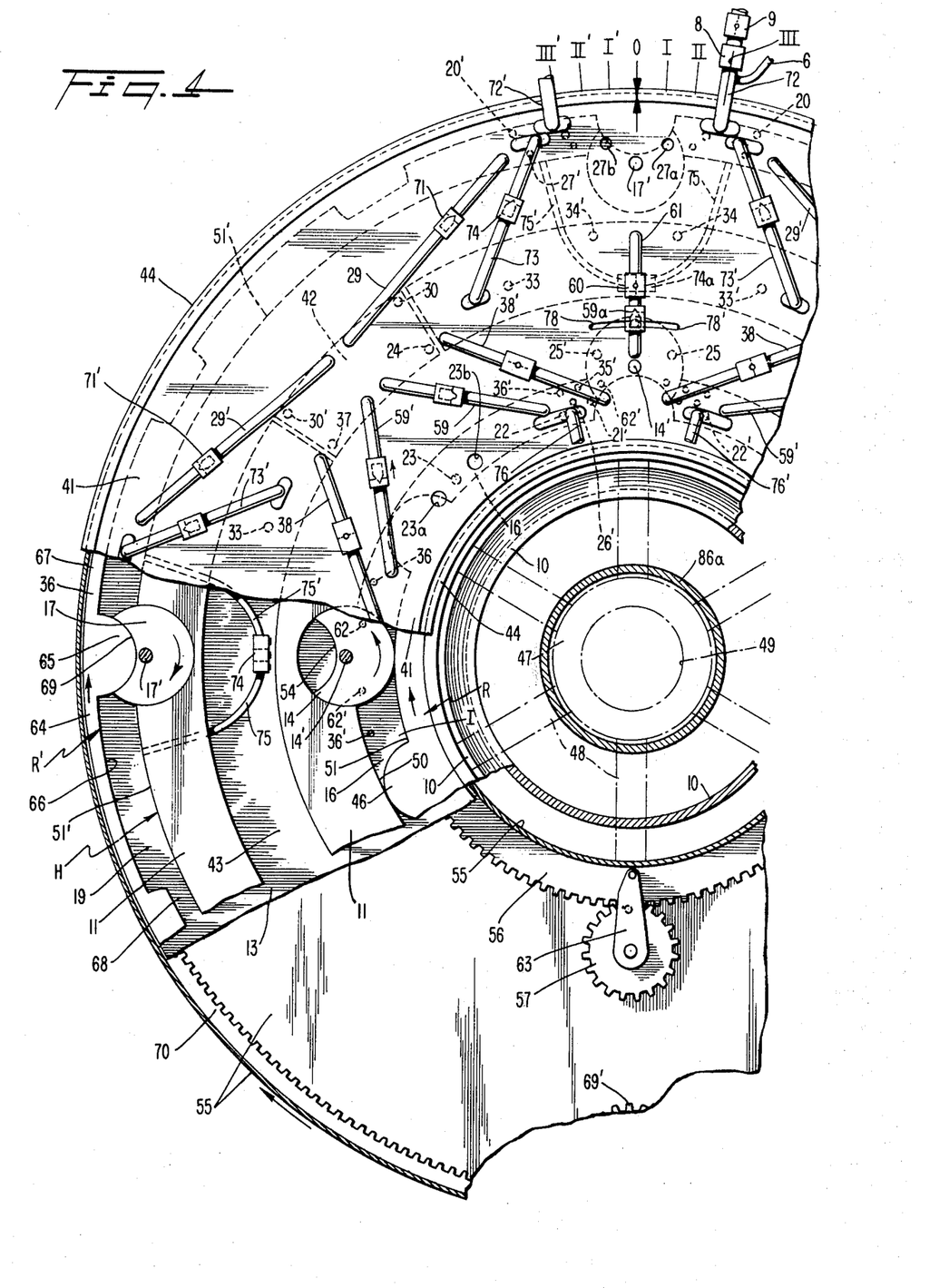
FIG. 4 is an end view partly in section and with parts broken away of the apparatus of FIG. 1 when the control valve is in "stop" position, the view being taken substantially on line 4—4 of FIG. 2.

When the engine is operated in the internal combustion mode, utilizing a fuel-air mixture or the like, the mixture is supplied under suitable pressure to the reaction volumes I through a conduit 61 and one set of the complementary inlet ports 25 or 25', depending upon the direction of rotor rotation desired. These ports in end plate 12 are normally closed by rotary divider members 14 and communicate with the cavities 15 in the housing section 11 when the recess 54 registers therewith. Conduit 61 may be mounted on valve disc 41 and hence adjusted to serve either port 25 or 25' while the other is closed by said valve. Suitable valve means 60 may be provided for throttling and cutting off the flow of combustible mixture to ports 25 and 25'. A one-way check valve 59a (FIG. 9) may also be provided in the supply line 61 to these ports to obviate any flame back to the source of combustible mixture. Thus, for counter-clockwise rotation of rotor R as viewed in FIG. 9, the unused ports, including inlet port 25', are closed and the precompressed combustible mixture is supplied through inlet port 25 when the rotor R and a rotary divider 14 are passing through the relative positions illustrated in FIG. 11, i.e., when the inlet port 25 registers with the recess 54 in the divider. The precompressed charge in the combustion space then bounded by a rotor piston 46, rotor surface 51, housing surface 50 and a divider 14 is ignited by a spark plug 62 which may be mounted in end plate 13 (FIGS. 2 and 4) and periodically connected to and energized by a suitable known type of electrical ignition system through an arm or brush 63 mounted for rotation with divider 14 or its driving pinion 57 (FIGS. 2 and 4). It will be understood that combustible charges are preferably simultaneously ignited in diametrically disposed chambers.

Figures 8, 9:
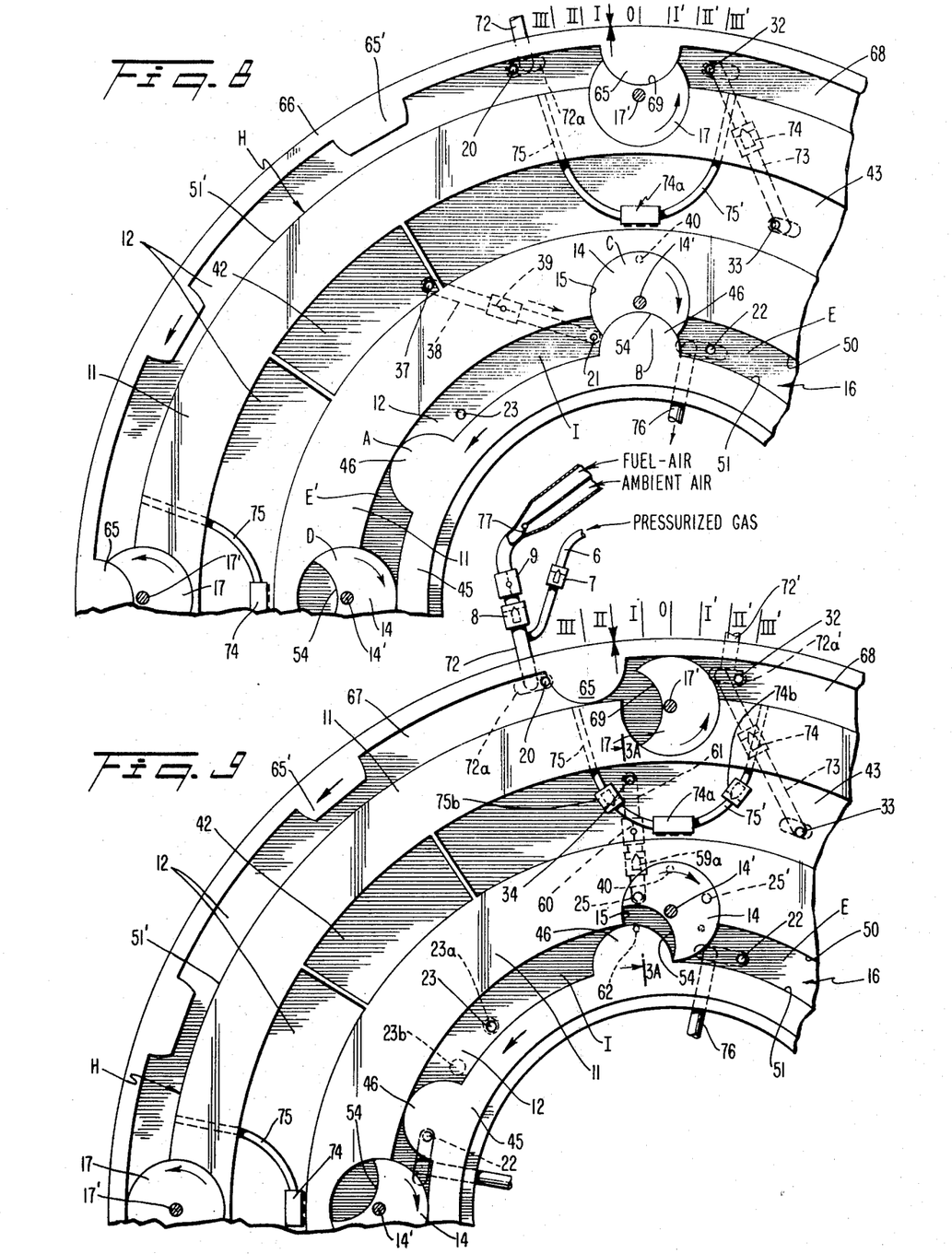
FIGS. 8, 9 and 10 are similar to FIG. 5, each view showing only the ports and connecting conduits therefor which are functional when the apparatus is operated with compressed gas (FIG. 8), operated as a combination combustion engine and compressor (FIG. 9), and operated as a gaseous compressor (FIG. 10)

The burning gases expanded to drive the piston 46 and hence, rotor R counter-clockwise. At the same time, the spent or burned gases from a previous combustion at the same divider 14 and now preceding the thus driven piston are being driven out through an exhaust port 22 by said piston. Exhaust ports 23 for the spent gases may also be provided in end plate 12 midway between successive dividers 14. Thus, as seen in FIG. 8, one combustion chamber will be substantially purged of exhaust gases through port 23 before the succeeding new combustion chamber begins to form at the same position as the rotor moves from its position in FIG. 8 to its positions in FIGS. 9 and 11. Accordingly, when port 25 is again opened (FIG. 11) the incoming fuel-air mixture will not be contaminated by residual burned gases. During other modes of operation, ports 23 may be closed, as by valve disc 41.

The above-described apparatus, thus operable as a prime mover, may be readily and quickly converted to operate as a gaseous compressor when power, such as the kinetic energy of a landing aircraft, is available to drive the rotor R from shaft 10 or otherwise. Thus, the case of an aircraft upon landing, for example, the rotor may be driven by the landing gear wheel assembly and utilized as a pneumatic compression brake to supplement and assist the regular braking system of the craft and to simultaneously compress ambient air and store it under pressure, thereby advantageously utilizing and conserving much of the energy represented by the momentum of the craft. In this mode of operation, ambient air is drawn into expanding chambers I through ports 26 in end plate 12, such as by piston A as it is moved counter-clockwise away from divider C (FIG. 5). The ambient air thus drawn in through a port 26 and a registering port in disc 41 is compressed between the following piston B and divider D and discharged through port 21', conduit 59 and port 24 to a compressed air storage tank, such as space 42, for subsequent use as a source of energy for driving the engine rotor in the prime mover mode of operation first described above. In this event, the stored air would be supplied from space 42 through port 37 and conduit 38 to inlet port 21 (FIG. 8).

To enhance the self-sufficiency and utility of the abovedescribed engine-compressor R, H and to supplement the power output thereof as a prime mover and the capability thereof as a compressor, the same may be and preferably is novelly combined with the momentum of the craft. In this mode of operation, ambient air is drawn into expanding chambers I through ports 26 in end plate 12, such as by piston A as it is moved counter-clockwise away from divider C (FIG. 5). The ambient air thus drawn in through a port 26 is compressed between the following piston B and divider D and discharged through port 21' and conduit 59 to a compressed air storage tank, such as space 42, for subsequent use as a source of energy for driving the engine rotor in the prime mover mode of operation first described above. In this event, the stored air would be supplied from space 42 through ports 37 and conduit 38 to inlet port 21.

To enhance the self-sufficiency and utility of the abovedescribed engine-compressor R, H and to supplement the power output thereof as a prime mover and the capability thereof as a compressor, the same may be and preferably is novelly combined with and supplemented by means driven by or with the power rotor R for compressing gases and gaseous mixtures and storing the same for use in driving the power rotor R or alternatively for converting fluid pressure energy to mechanical energy in the same manner as rotor R. In the form shown, said supplementary or auxiliary means comprises the annular rotor R' which includes a ring or body portion 64 and a plurality of equally spaced pistons 65 and ribs 65'. Rotor R' has a close running and sealing fit in the annular channel bounded by the outer peripheral surface 51' of housing member 11 and the outer peripheral margins of end plates 12 and 13 and is secured to and primarily supported by rotor R for rotation therewith by suitable means such as drum 55 (FIG. 2) or the like. The pistons 65, four of which are shown, are substantially similar to rotor pistons 46 and project inwardly from ring 64 into close running and sealing relationship with the outer peripheral surface 51' of central housing member 11. If desired sealing strips or rings (not shown) may be provided in a known manner between ring 64 and end plates 12, 13, as well as laterally and radially across pistons 65 to eliminate gas leakage past the same. Rib 65' are structurally the same as pistons 65 with the crowns thereof removed. A plurality of rotary dividers 17 -- four equally spaced dividers being shown by way of example -- are rotatably mounted in recesses or cavities 18 provided in the outer periphery of housing member 11 and extend from said recesses into sealing rolling engagement with the inner surface 66 of rotor body 64 to thereby sealingly divide each arcuate space formed by surface 51', surface 66 and a pair of adjacent pistons 65 into an expanding reaction or intake volume 67 and an exhaust or compression volume 68 depending upon the direction of rotor rotation and the selected mode of operation. Each divider 17 has at least one axially extending surface recess 69 contoured to accurately receive and permit the passage of each of the pistons 65 and ribs 65' as the dividers and rotor R' rotate synchronously relative to housing H. The ribs 65' cooperate with rotary dividers 17 to prevent communication between said intake and exhaust volumes 67 and 68 without further dividing the arcuate space 19 between successive pistons 65. Each divider 17 may be rotated by any suitable means, such as through its shaft 17', a pinion 69' and an annular gear 70 carried by drum 55 which is in turn connected to rotor R. Thus, the surface speed of dividers 17 may be made equal to the speed of the rotor surface 66 engaged thereby to attain rolling contact. If desired, sealing strips may be employed in known manner to attain improved sealing against leakage of gases.

It will thus be apparent that the outer rotor R' may function in cooperation with housing H and dividers 17 in the same modes and for the same purposes as the inner rotor R cooperates with dividers 14 and housing H. Thus, rotor R' may be driven by introducing pressurized gases from any suitable source through conduit 6, one way valve 7 and conduit 72 (FIG. 9) into the volumes 67 and exhausting the spent gases from volumes 68 at the same time that rotor R is driven by pressurized gases (FIG. 8) from compartment 42 or other suitable source in the manner above described. Similarly, when rotor R' is driven, as by an external source or by rotor R and drum 55 (FIG. 10), ambient air may be drawn in through ports 27 or 27' and compressed between each piston 65 and a divider 17 for discharge through suitable ports 28 or 28' to an accumulator or storage space, such as through conduits 29 or 29' and ports 30 or 30' to the storage compartments 42 in housing H, said conduits being equipped with one-way valves 71 and 71', respectively. During such operation ports 27, 28 and 30 and conduits 29 are operative for counter-clockwise rotor rotation (FIG. 10) and ports 27', 28' and 30' and conduits 29' are operative for clockwise rotor rotation.

Figure 10:
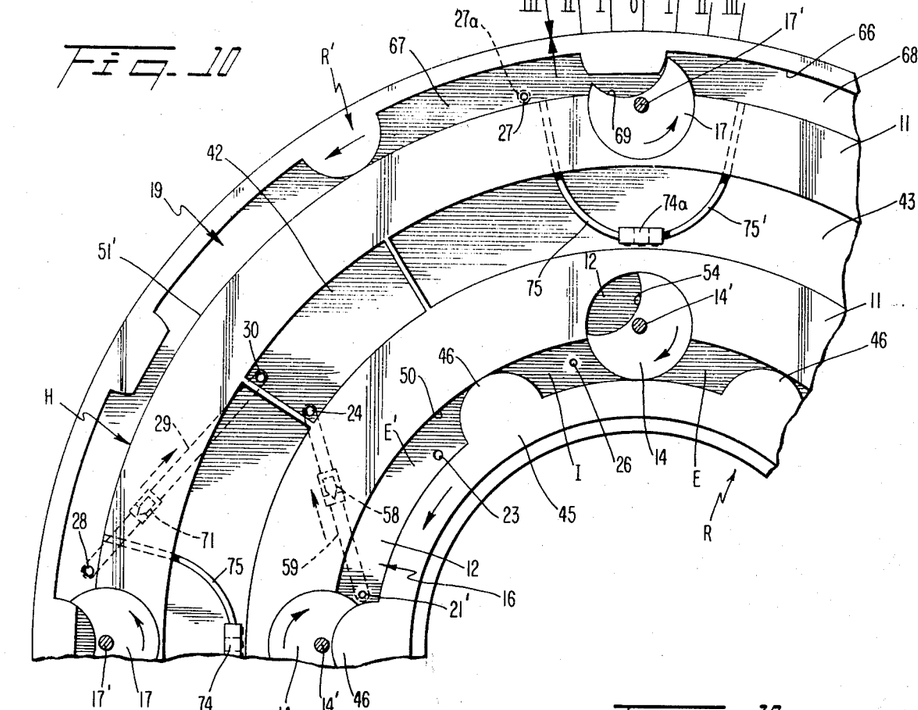

As heretofore mentioned, the selection of the various modes of operation for counter-clockwise rotor rotation as viewed in FIGS. 8 to 10 (clockwise in FIG. 14) is accomplished by angular adjustment of disc valve 41 to one of the several positions indicated by Roman numerals I, II and III at the tops of said figures. For the opposite or clockwise rotor rotation, valve 41 is adjusted to positions indicated by the same Roman numerals with an added prime ('). Valve position 0 is for stop (FIG. 4), positions I and I' are for gaseous pressure operation of rotor R and compression and storage of air or a combustible mixture by rotor R' (FIG. 8), positions II and III' are for operation of rotor R by internal combustion and of rotor R' for compression and storage of air or a combustible mixture, and positions III and III' are for compression of ambient air by both rotors R and R' and storage thereof in compartments 42 when the rotors are being driven by an external source, such as the landing gear wheels of an aircraft. Compartments 42 may be provided with a pressure safety valve (not shown).

Disc valve 41 has mounted thereon a plurality of crossover conduits 29, 38, 59 and 73 and their complements indicated by the same numerals with a prime ('). Each of said conduits has a terminal port at each end thereof through the disc which is adapted to register with a port in end plate 12 that is to be functional for the selected position of the disc to effect a desired mode of operation. Conduits 61, 72 and 76 are connected at only one end thereof to disc 41 at ports adapted to communicate with ports in end plate 12. Some of said conduits, such as conduits 72, 73 and 76, are adapted by means of elongated arcuate grooves or slots in the inner face of disc 41 to communicate with the same ports in plate 12 when the disc 41 is in more than one operative position. Ports in plate 12 which are not functional for the selected mode of operation are closed by disc 41 and in the form shown, some ports in said disc without conduits are adapted to register with ports in plate 12, such as ports 23, 26, 27 and 40, and connect the same to the external atmosphere.

Figure 3:
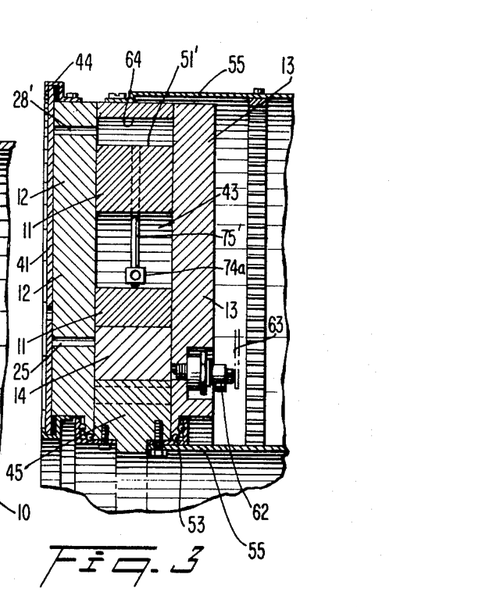
FIG. 3 is a detail axial section with parts removed, the section being taken substantially on line 3—3 of FIG. 1.

To assist one in better understanding the construction and operation and in relating the following description to the drawings, it is again noted that FIGS. 5, 6 7, 11 and 12 diagrammatically shown full sets of the ports in end plate 12 in the vicinity of each of the rotary dividers 14 and 17 which communicate with spaces 16, 19, 42 and 43, cavities 15 and the external atomsphere. The relative positions of the spark plugs 36, 36' and 62, 62' which are mounted in end plate 13 (FIGS. 3 and 4) are indicated with dotted lines in FIGS. 5 and 9 to 12. In the diagrammatic illustrations of FIGS. 8, 9 and 10 with disc valve 41 in positions I, II and III, respectively, only the functional ports in plate 12 and functional conduits are shown. In each case, the non-functional ports are closed by disc 41 and the non-functional conduits are closed by end plate 12.

A preferred utilization of the outer mechanism comprising rotor R' is in the performance of a novel method contemplated by the invention for operating the inner mechanism comprising the rotor R as internal combustion engine, which method includes precompressing ambient air or an air-fuel mixture externally of the combustion spaces I and introducing and igniting the same in such spaces as the latter expand during rotation. In this mode of operation, assuming counter-clockwise rotation of the rotors as viewed in FIG. 9, with valve 41 in position II, a fuel-air mixture from a carburetor or other suitable known source is drawn into each volume 67 through a flap valve 77, throttle 9, one-way valve 8, a conduit 72 on disc 41, an arcuate slot 72a in disc 41 and inlet port 20 at one side of a divider 17. At the same time, a fuel-air charge thus previously drawn in is being compressed in a volume 68 between an oncoming or trailing piston 65 and the other side of the same divider. The compressed charge is discharged into a storage space 43 via port 32, groove 72a' in disc 41, conduit 73, one-way valve 74 and port 33. Control of the maximum pressure in compartments 43 may be effected in any suitable known manner, and in the form shown means for this purpose comprises one or a plurality of pressure relief valves 47a adapted to discharge surplus gases from compartments 43 through one of conduits 75 or 75', extending to the low pressure intake volume 67. The serveral normally closed valves at 74a may be of known construction and are set to open in response to different desired pressures. Any one of these valves may be selectively rendered operative in a known manner by mechanical, electro-mechanical or other suitable means for effecting pressure relief at a selected maximum pressure in compartment 43 and hence, the desired compression ratio for most ideal engine operation. One-way valves 7 and 8 prevent any blow-back from chambers 67 through conduit 72 when excess pressure is released by a valve 74a from a compartment 43. One-way valves 74b and 75b (FIG. 9) may be provided to prevent direct flow through conduits 75, 75' between volumes 67 and 68.

Still referring to FIG. 9 with valve disc 41 in position II, the pressurized fuel-air mixture is supplied from compartments 43 to rotary divider cavities 15 via ports 34, conduits 61 and ports 25 preferably under control of a butterfly throttle valve 60 and a one-way valve 59a. Thus, when recess 54 of a rotary divider 14 registers with port 25, a combustible charge compressed to a preselected pressure is admitted to cavity 15 between a rotor piston 46 and a divider 14 (FIG. 11) and ignited by a spark plug 62 in the manner above described to impart counter-clockwise rotation to rotor R. At the same time, the combustible charge previously ignited at the same location has completed its power pulse and is being exhausted through port 23 and subsequently through port 22. For clockwise rotation in FIG. 9, the valve 41 is moved to position II', and the combustible charge is admitted at port 25'. With valve 41 in position II or II', ports 23a or 23b therein, respectively, register with ports 23.

In the event one desires to operate the engine in the solid fuel injection mode, ambient air is admitted in place of a fuel-air mixture through conduit 72 by properly setting the butterfly valve 77. The air is compressed by rotor R' in the manner above described and directed through conduit 73, compartment 43 and conduit 61 to the combustion chamber of the inner engine R, H in the same manner as the compressed fuel-air mixture. A measured quantity of liquid fuel may then be injected through a port 35 by any suitable known means and timely ignited by a spark plug 36 mounted in housing end plate 13. The fuel is preferably injected when the parts are in the positions shown in FIG. 12. Spark plug 36 and its complement 36', which function during clockwise rotation of the rotor, may be energized by a suitable known type of ignition system in timed relation with the rotor through the electrode or brush 63 on shaft 14'. Burned gases are exhausted as described above through port 22 and a conduit 76 and through port 23 when it is provided.

To start counter-clockwise operation of the above-described apparatus as viewed in FIG. 9, in the internal combustion engine mode, the rotors may be initially rotated by pressure of the fluid stored in compartments 43 with valve disc 41 in postion II, or initial rotation may be imparted from an external source of torque energy through shaft 10. Initial counter-clockwise rotation may also be imparted by a pressurized gaseous medium from storage compartments 42 or a suitable external source with valve disk 41 in position I (FIG. 8). Gases stored in compartments 42 under substantial pressure are then admitted through port 37, conduit 38 on disc 41, and port 21 to expansion volume I under control of a throttle valve 39 whenever port 21 is not covered by a piston 46. The spent gases are discharged through exhaust ports 22 and conduits 76. The latter, like conduits 72 and 73 and their complements, terminate in arcuate slots, such as slot 72a in disc 41 to thereby communicate with the same port in end plate 12 during more than one position of said disc. Thus, conduit 72 communicates with inlet port 20 when the valve disc 41 is in positions II and III (FIGS. 8 and 9).

While the rotor R is thus powered by gases from compartments 42, the rotor R' is supplying compressed air or fuel-air mixture to compartments 43, as heretofore described and illustrated in FIG. 8. When sufficient pressure has been thus built up in compartments 43, valve 41 may be shifted to position II (FIG. 9) to effect operation of the inner engine R, H by combustion to drive rotor R, 10 and hence, operation of the outer rotor R' for precompressing the combustible mixture or air admitted through conduit 72 and pumped into compartments 43 in the manner fully described above.

When rotors R and R' are driven counter-clockwise by an external source connected to shaft 10 with valve 41 in position III (FIG. 10), air at atmosphere pressure is admitted through ports 26 and 27 in plate 12 and matching ports in valve disc 41 to expanding volumes I and 67, respectively, and is thereafter compressed between oncoming pistons 46 and 65 and dividers 14 and 17, respectively, whereby a resisting or braking force is exerted in opposition to the external power source. The input energy thus converted to fluid pressure is conserved by directing the air thus compressed to storage compartments 42 through conduits 29 and 59' or to an external accumulator. It will be noted that ports 21 and 21', which register with conduits 59' and 59, respectively, are thus employed as discharge or exhaust ports when disc 41 is in positions III and III' (FIG. 10), but as inlet ports in registry with conduits 38 and 38', respectively, when the disc is in positions I and I' (FIG. 8). For this compressor or conservation of energy mode of operation, rotor R may also be driven by a driven shaft connected to the rotor by a hub 47 and spokes 48 illustrated by construction lines in FIGS. 2 and 4.

If desired, the space formed between recess 54 in each rotary divider 14 and the arcuate wall surface of cavity 15 may be exhausted to atmosphere through a port 40 in plate 12 and a registering port in disc 41 during each revolution of the divider. During engine operation ports 40 may be open to atmosphere continuously through suitable arcuate slots 78, 78' in disc 41 (FIG. 4). When the latter is in position 0 (FIGS. 1 and 4) to effect stoppage of the apparatus, all ports in end plate 12 are preferably covered and hence closed by disc 41. It will be understood that views illustrating the various positions I', II' and III' of valve disc 41 for effecting clockwise rotor rotation as viewed in FIG. 1 would be mirror images of FIGS. 8, 9 and 10 which depict counterclockwise rotation.

Figure 3A:
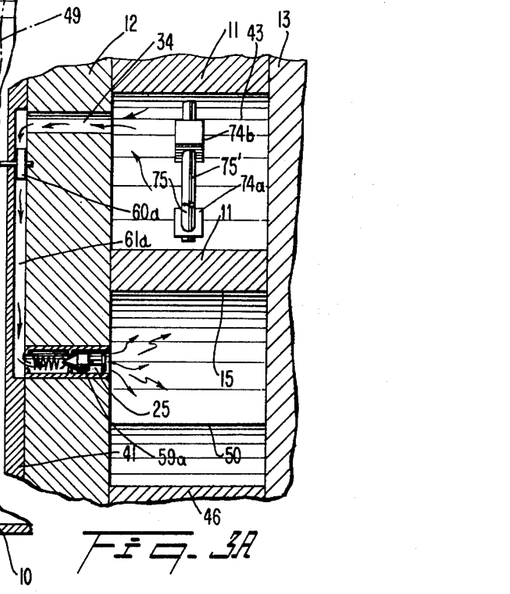
FIG. 3A is a detail view showing an alternative embodiment of the fuel-air mixture supply line and valves therein as seen in the plane of line 3A—3A of FIG. 9.

In lieu of cross-over conduits on disc valve 41, as shown in FIG. 2, the desired connections between ports in end plate 12 may be effected by internal passages in a laminated disc and/or by grooves in the inner face of the disc. An example of the latter alternative is illustrated in FIG. 3A, wherein a groove 61a and throttle valve 60a are substituted for conduit 61 and valve 60, and the one-way valve 59a, for preventing flash-back when a fuel-air mixture is employed, is mounted in port 25 in end plate 12.

Figures 13, 14:
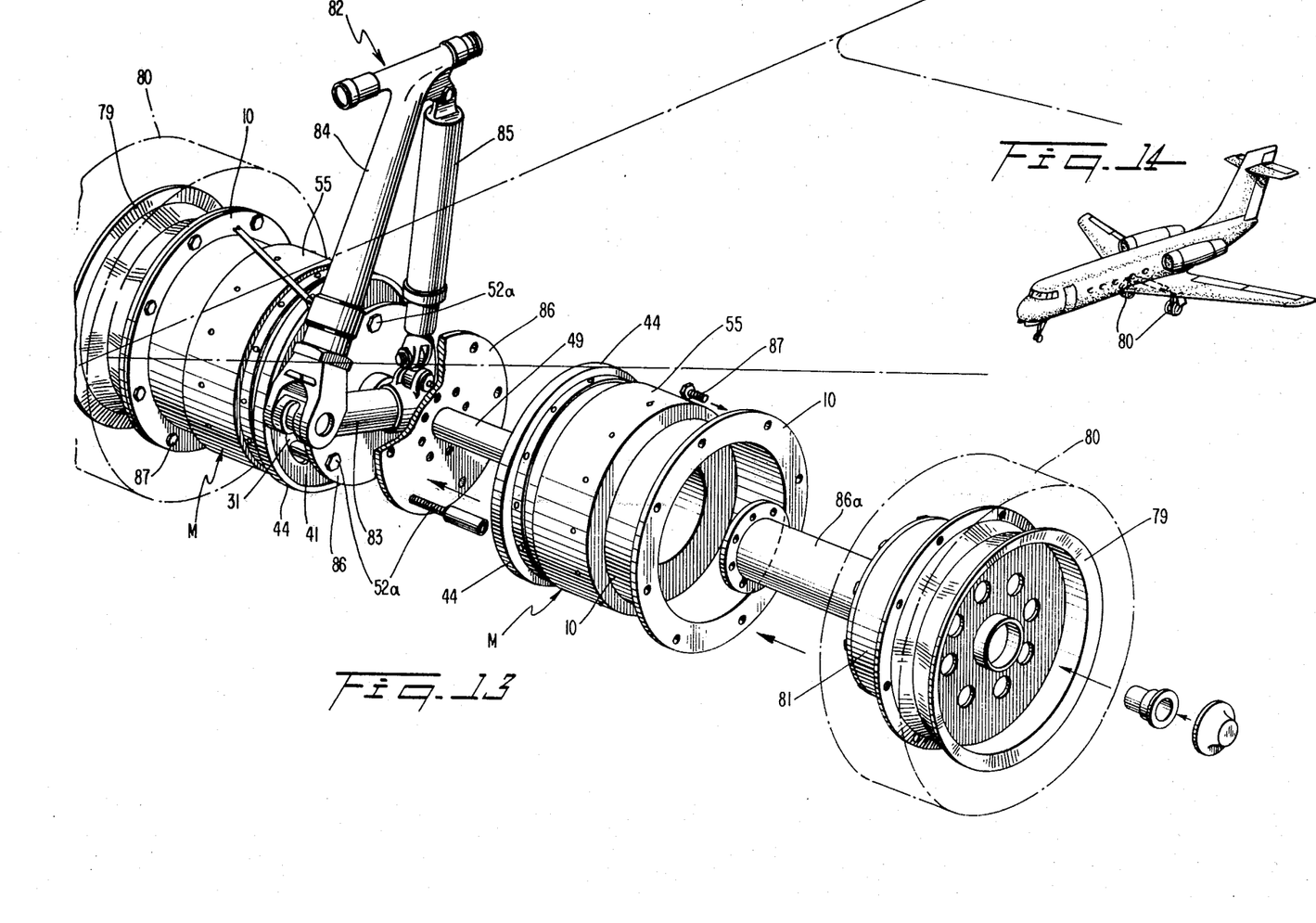
FIGS. 13 and 14 are isometric views of the apparatus of FIGS. 1 to 12 in combination with a vehicle, such as the landing gear assembly of an aircraft, a portion of the combination being exploded in FIG. 13.

The apparatus above described is illustrated in FIGS. 13 and 14 in novel and highly beneficial combination with a modern aircraft and more particularly with the retractable landing gear wheel assembly thereof, only one dual wheel strut assembly being shown in detail. In the form shown, two disc wheels 79 carrying pneumatic tires 80 are mounted and are free to rotate on the opposite ends of a non-rotatable shaft 49. The fuselage of the aircraft is connected in a known manner at 82 to the center of shaft 49 by means of a strut assembly comprising the links 83, 84 and a shock absorber 85. Each wheel 79 is preferably equipped with a remotely controlled hydraulically actuated disk brake assembly 81 of well known construction in a manner known in the art.

To assist the main aircraft engines during take-off, to spin-up the wheels for landing, to assist the brakes after landing, and to supply power for taxiing the aircraft, a motor-compressor M of the type hereinabove described or one embodying similar characteristics may be mounted between each wheel 79 and the strut assembly. The housing H of each motor may be rigidly secured to shaft 49 and hence to the strut assembly by any suitable means such as by means of a flange or disc 86 and bolts, such as extensions of the bolts 52 which hold the parts of the housing assembled and/or stud bolts 52a which are anchored in plate 12 and extend through arcuate slots 31 in valve disc 41. The rotor R is preferably connected to the flange or rim of wheel 79 for rotation therewith by means of hollow shaft 10. For simplicity shaft 10 and wheel 79 are shown connected by bolts 87 but it may be desirable to utilize any suitable known means which will permit the rotor and wheel to seek non-parallel planes of rotation if this is necessitated by forces applied thereto. The non-rotatable disks of brake assembly 81 may also be connected to shaft 49 by a hollow tube 86a which extends through shaft 10 and is connected to flange 86. In the interest of clarity the ducting on disc valve 41 has With storage spaces 42 charged with a gaseous medium at high pressure and valve disc 41 in position I or I', a high instantaneous and sustained torque may be applied by rotor R to wheel 79 to rapidly accelerate the forward motion of the craft on the runway so that the craft will attain its required speed for take-off in a materially shorter time and distance than is possible with the main engines acting alone. If desired, the pressurized gaseous medium may be supplied directly to inlet 21 or 21' from an external source elsewhere on the craft. Similarly, when the aircraft is airborne and ready to land, the motors M may be energized by pressurized gases as above to spin-up the wheels 79, 80 to a speed consistent with the landing speed of the plane. This procedure greatly reduces scuffing of the tires 80 and materially reduces the hazards attendant to landing, including the onset of dynamic hydroplaning. The motors M may also be similarly energized and utilized as the sole source of power for moving the plane on the ground, such as for taxiing and docking.

When the aircraft has touched down and it is desirable to bring it to a stop or to taxiing speed in the shortest distance consistent with safety, the valve discs 41 may be shifted to position III, whereby the motors M will function as compressors in the manner above described and hence assist the brakes 81 in reducing the speed of the plane. As pointed out above, the air thus compressed is directed to and stored in compartments 42 or if desired in an external accumulator for subsequent use in driving the rotors of the motors M. A sizeable portion of the kinetic energy of the landing plane may thus be usefully conserved.

Figure 15:
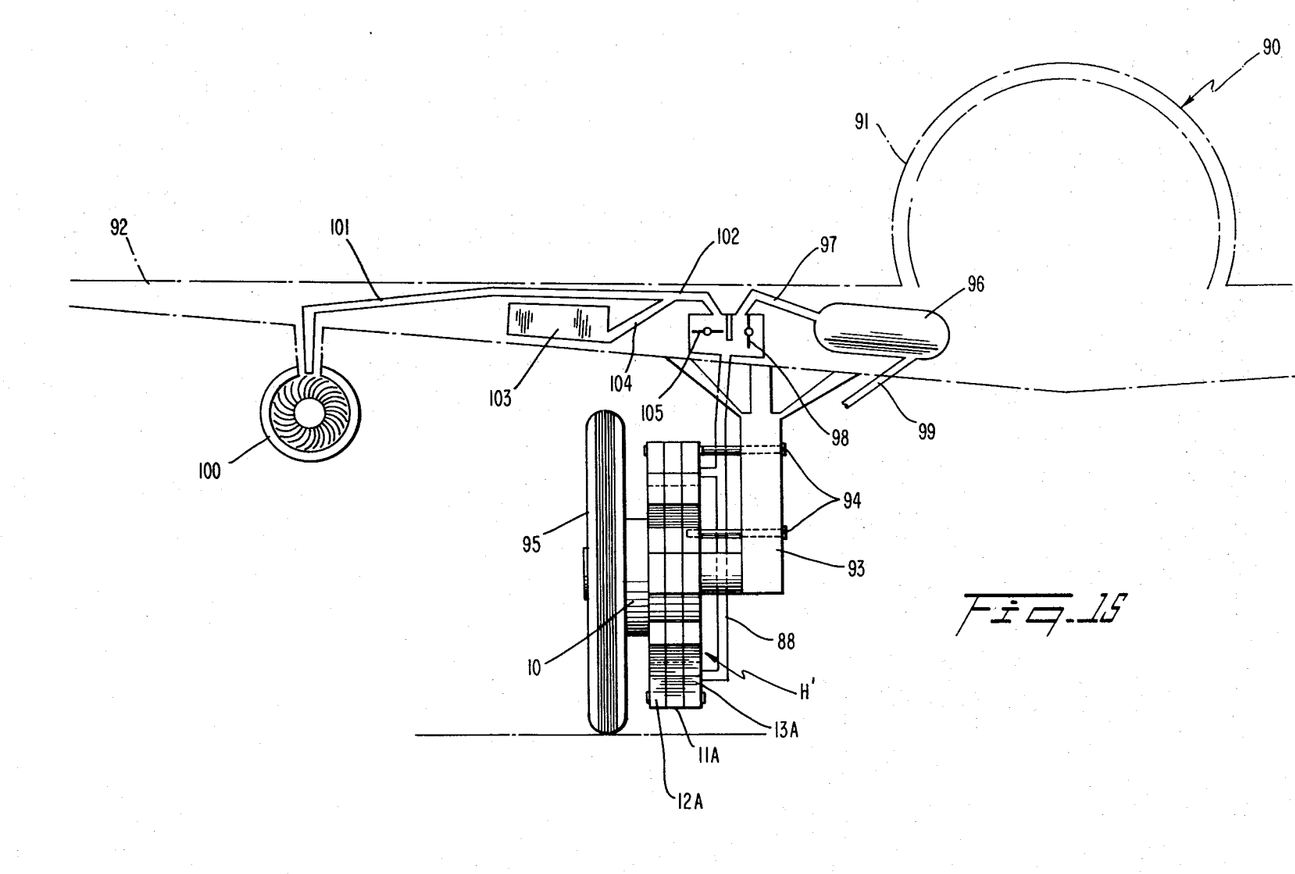
FIG. 15 is a diagrammatic elevation view illustrating an engine-compressor of the type embodied in the central portion of FIG. 1 in combination with an aircraft.

It will be apparent that the inner engine-compressor embodying rotor R may function in the various modes described without the addition of rotor R' and compartments 42 and 43. In this event compressed gases and fuel-air mixture would be supplied from external sources. Such an installation on a jet aircraft is diagrammatically shown in FIG. 15, wherein the aircraft body, generally designated by the numeral 90, includes a fuselage 91 and a wing section 92. The auxiliary motor housing H', comprising center section 11A and end plates 12A, 13A, is secured to the aircraft strut assembly 93 by bolts 94, and the motor rotor is connected to wheel assembly 95 by means of tubular shaft 10. This structure may be duplicated in connection with the right-hand wheel assembly (not shown).

A suitable gaseous medium under pressure is stored in accumulator tank 96, comparable to compartments 42, and supplied to the rotary motor via conduit 97, a suitable valve 98, and conduit 88 which may correspond to conduit 38 of FIG. 8 or conduit 61 (FIG. 9). Upon landing, when the motor rotor is driven by the aircraft, air compressed thereby in the manner described above with reference to FIG. 10 may be utilized to assist in braking the craft and piped into accumulator 96 via conduit 99 corresponding to conduit 59 of FIG. 10 for storage under pressure. For internal combustion mode of operation, a fuel-air mixture under compression may be supplied from any suitable source to conduit 88. As shown excess bleed-off air under pressure from a conventional jet engine 100 is fed through conduit 101 and mixed in conduit 102 with fuel supplied from a tank 103 through a conduit 104. From conduit 102, the combustible mixture is fed through a suitable control valve 105 to conduit 88. Appropriate known types of controls, as for the various valves, may be provided at the pilot's station or at an appropriate station on any other vehicle similarly equipped for selecting modes of operation. The engine H' may also be constructed as disclosed in my above-mentioned parent applications Ser. Nos. 658,175 and 40,720, and disclosures of said applications are hereby incorporated herein by reference.

There is thus provided a novel and highly efficient rotary internal combustion engine adapted to function in a novel manner on either a precompressed gaseous combustible mixture or solid fuel injection and further adapted to be powered by pressurized fluids or to be readily converted to function alternatively as a compressor. The novel apparatus contemplated by the invention and the novel method of operation thereof permit substantial or complete expulsion of burned gases from each combustion chamber preparatory to the introduction of a fresh combustible charge having an optimum fuel-air ratio whereby the quantity of any residual burned gases in the chamber may be utilized to advantageously control the combustion temperature of the charge. The ability of the disclosed apparatus to deliver high torque at low speeds as well as over a wide range of speeds, and the ability thereof to alternatively function as a compressor make the same available for an extensive range of varied applications, from small hand-held tools, for example, to the novel combination thereof with an aircraft to provide supplementary take-off acceleration, wheel spin-up for landing, supplementary braking power after landing, and taxiing power without appreciably increasing the size and weight of the aircraft. The novel construction of the apparatus hereby provided lends itself to design and production in a wide variety of sizes and shapes wherein the number of power pulses per rotor revolution may be large and varied without appreciable change of over-all size and shape. In the contemplated novel and advantageous method of operation of the disclosed apparatus in the internal combustion mode, the air or fuel-air mixture is precompressed and caused to expand from a reservoir into the combustion chamber as distinguished from being compressed therein, whereby turbulence is advantageously increased, and by reason of heat losses in the reservoir and during expansion, the density of the mixture is advantageously increased.

Although only a limited number of embodiments and variations have been illustrated in the drawings and specifically described in the foregoing specification, it is to be expressly understood that the invention is not limited thereto. Many changes may be made in the specific arrangement and design of the parts illustrated without departing from the spirit and scope of the in-

What is claimed is:

1. The combination on a vehicle such as an aircraft, of a stationary axle secured to the chassis of the vehicle, a vehicle supporting wheel mounted on the axle for rotation relative thereto, a fluid pressure driven rotary engine surrounding said axle, said engine comprising a stationary housing secured to said chassis and a power rotor in the housing integrally connected to said wheel to rotate the latter relative to said axle, and means for selectively controlling the emission of fluids from said housing to resist rotation of said rotor by said wheel.

2. The combination defined in claim 1 wherein said rotor comprises a plurality of radially extending piston portions joined at the roots thereof by circular arc surfaces concentric with the rotor axis whereby to form a plurality of arcuate spaces in said housing between adjacent piston portions, and further comprising divider means movable about a fixed axis parallel to the rotor axis for dividing a said space into reaction and exhaust volumes, the maximum radius of said divider means being less than the minimum distance between its axis and said circular arc surfaces of the rotor.

3. A combination as defined in claim 2 wherein said divider means are so constructed that opposing torsional forces imposed thereon by fluid pressures in said reaction and exhaust volumes are balanced.

4. A combination as defined in claim 1 wherein the overall axial dimension of said engine is small in comparison to the overall dimension thereof transversely of the axis.

5. A combination as defined in claim 1 wherein said rotor has at least one radially extending piston portion and forms with the housing an enclosed space for receiving a fluid, such as gases under pressure, to act on said piston portion and thereby impart rotor, and the housing comprises means forming a chamber adjacent the outer periphery of the rotor and adapted to communicate with said space through an opening in the housing and further comprising means in said chamber dividing the same and said space into an expansible intake volume and a contractable exhaust volume, said volumes being functionally interchangeable and said dividing means comprising a member movable about a fixed axis and means responsive to rotor rotation for applying positive mechanical force to rotate said member in clockwise and counter-clockwise directions about its axis to permit passage of said piston portion during rotation of the rotor in counter-clockwise and clockwise directions, respectively.

6. The combination comprising a vehicular chassis, an axle fixedly mounted on said chassis, means including a wheel mounted on said axle for rotation relative thereto for movably supporting said chassis, means surrounding said axle for compressing a gaseous medium comprising a housing fixedly secured to the chassis and rotor means in the housing, means for securing said rotor means directly to the wheel for simultaneous rotation therewith and means for controlling the emission of compressed gases from said compressing means, whereby rotation of the rotor means by the wheel and hence movement of the chassis may be controllably resisted.

7. A combination as defined in claim 6 wherein the chassis is the frame of an aircraft.

8. A combination as defined in claim 6 wherein said rotor means may be selectively fluid pressure driven for imparting torque to said wheel to rotate the latter and thereby move said chassis.

9. The combination comprising a vehicular frame, an axle non-rotatingly mounted on said frame, means including a wheel rotatably mounted on said axle for movably supporting said frame, power means for rotating said wheel on said axle, said power means comprising a housing fixedly mounted on said frame and rotor means in said housing, coaxial with said axle and means for fixedly securing said wheel to the rotor means for simultaneous rotation therewith.

10. A combination as defined in claim 9 wherein said power means surrounds said axle adjacent the wheel.

11. A combination as defined in claim 9 wherein said rotor means are fluid pressure driven to impart torsional forces to said wheel.

12. A combination as defined in claim 11 wherein said power means is a rotary internal combustion engine.

13. The combination on an aircraft, of a landing gear assembly comprising an axle, means such as a strut connecting said axle to the chassis of the aircraft, a wheel mounted on said axle for rotation relative thereto and brake means for selectively resisting rotation of said wheel on said axle, and a rotary apparatus surrounding said axle and comprising a fluid pressure driven rotor coaxial with the axle and fixedly connected to said wheel for rotation therewith and a housing for the rotor fixedly connected to said assembly, and means for supplying fluid medium under pressure to said apparatus to impart rotation to the rotor and wheel.

14. A combination as defined in claim 13 comprising means for controlling the emission of a fluid medium under pressure from said apparatus when the rotor is driven by said wheel whereby the apparatus functions as a compressor to resist rotation of the wheel.

15. The combination with an aircraft landing gear assembly which includes a strut and a wheel rotatably mounted on the strut of apparatus comprising a rotor secured to the wheel for rotation therewith, said rotor having a cylindrical body portion and one or more piston portions extending radially from the periphery of said body portion, a housing fixedly secured to the strut and at least partially enclosing said rotor to thereby form one or more enclosed chambers, one or more rotary dividers in said housing which divide said chambers and thereby define with said piston portions one or more expansible volumes and one or more retractable volumes, whereby fluids under pressure within said expansible volumes act on said piston portions to apply torque to said rotor, and means for rotating said dividers in predetermined timed relation with the rotor.

16. A combination as defined in claim 15 comprising means for selectively operating said apparatus as a prime mover for driving the wheel or as a compressor driven by the wheel.

17. A combination as defined in claim 1 wherein said chassis is movably supported by said wheel and axle, and said rotor is rotatably driven by direct application thereto of fluid pressure within the housing.

18. A combination as defined in claim 9 wherein said rotor means is rotatably driven by direct application thereto of torsional force components of fluid pressure within the housing.

19. A combination as defined in claim 13 wherein said rotor is rotatively driven by direction action thereon of fluid pressure within said housing.

* * * * *

UNITED STATES PATENT OFFICE
CERTIFICATE OF CORRECTION

Patent No. 3,874,618                    Dated April 1, 1975

Inventor(s) Kenneth Clayton Bates

It is certified that error appears in the above-identified patent and that said Letters Patent are hereby corrected as shown below:

Column 6, line 9, "heavier-than" should read --heavier-than-air --. Column 8, line 19, "are driven" should read -- are being driven --; line 20, "fulid" should read -- fluid --; line 29, "the piston" should read -- the position of piston --. Column 11, line 37, "III' " should read -- II' --. Column 12, line 39, "47a" should read -- 74a --. Column 15, line 14, "has" should read -- has been omitted in Fig. 13. --. Column 17, line 37, "impart rotor" should read -- impart rotation to the rotor --. Column 18, line 6, "non-rotatingly" should read -- non-rotatably --; line 11, "housing, coaxial with said axle" should read -- housing coaxial with said axle,-- line 66, "direction" should read -- direct --.

Signed and Sealed this first Day of June 1976

[SEAL]

Attest:

RUTH C. MASON
Attesting Officer

C. MARSHALL DANN
Commissioner of Patents and Trademarks